United States Patent [19]

Bannister

[11] Patent Number: 5,325,810
[45] Date of Patent: Jul. 5, 1994

[54] LEAK OBSERVATION THROUGH CAPILLARY ACTION THAT EXPOSES MOISTURE

[75] Inventor: Tommy C. Bannister, Huntsville, Ala.

[73] Assignee: The Boeing Company, Seattle, Wash.

[21] Appl. No.: 79,421

[22] Filed: Jun. 21, 1993

[51] Int. Cl.$^5$ ............................................. G01M 3/00
[52] U.S. Cl. ............................................. 116/200
[58] Field of Search .................. 116/200, 206, 227; 138/104

[56] References Cited

U.S. PATENT DOCUMENTS

| | | |
|---|---|---|
| 1,800,693 | 4/1931 | Major . |
| 2,460,215 | 1/1949 | Chase ................. 116/206 X |
| 2,601,840 | 7/1952 | Smith et al. . |
| 2,708,896 | 5/1955 | Smith et al. . |
| 2,918,033 | 12/1959 | Snyder . |
| 2,918,893 | 12/1959 | Norton . |
| 2,951,764 | 9/1960 | Chase ................. 116/206 X |
| 3,217,689 | 11/1965 | Knight et al. . |
| 3,287,156 | 11/1966 | Griffith . |
| 3,502,436 | 3/1970 | Hoover et al. . |
| 3,597,263 | 8/1971 | Bancroft et al. . |
| 3,830,290 | 8/1974 | Thomasett et al. ............... 73/49.1 |
| 4,106,428 | 8/1978 | Matthiessen et al. . |
| 4,295,669 | 10/1981 | LaPrade et al. . |
| 4,735,083 | 4/1988 | Tenenbaum . |
| 4,864,847 | 9/1989 | Anderson et al. ............... 73/46 X |
| 5,190,069 | 3/1993 | Richards ............................ 137/312 |

Primary Examiner—William A. Cuchlinski, Jr.
Assistant Examiner—Willie Morris Worth
Attorney, Agent, or Firm—Kenneth J. Cooper; Robert L. Gullette

[57] ABSTRACT

A fluid leak detection apparatus identifies the location of a fluid leak in a fluid containing vessel. The apparatus includes a wick having a sensing portion and a transmission portion. The sensing portion contacts a selected area of the fluid containing vessel. The transmission portion extends from the sensing portion to transmit by capillary action leaked fluid from the fluid containing vessel. An indicator, connected to the wick transmission portion and the indicator, is activated by the wetted wick to indicate a fluid leak at the sensing portion of the wick.

6 Claims, 4 Drawing Sheets

LEAK OBSERVATION THROUGH CAPILLARY ACTION THAT EXPOSES MOISTURE

SUMMARY OF THE INVENTION

Leak detection systems have typically included electronic sensing devices located along joints in fluid transmission systems. These active electronic components sense the presence of fluid and electrically transmit a signal to an indicating device. Such systems may effectively locate fluid leaks, but such systems consume power in the process.

The invention provides a power-free apparatus for sensing the location of fluid leaks and identifying the location of that leak when the fluid transmission system is obscured from an observer's view.

An object of the invention is to sense the location of a fluid leak in a fluid transmission system when that leak is obscured from on observer. A second object of the invention is to transmit the location of a fluid leak to a remote indicator so a fluid transmission system inspector is alerted to the presence of a leak at the obscured location. A third object of the invention is to provide a remotely located leak indicator which is passively activated so as to consume no electrical power.

Figure 1:
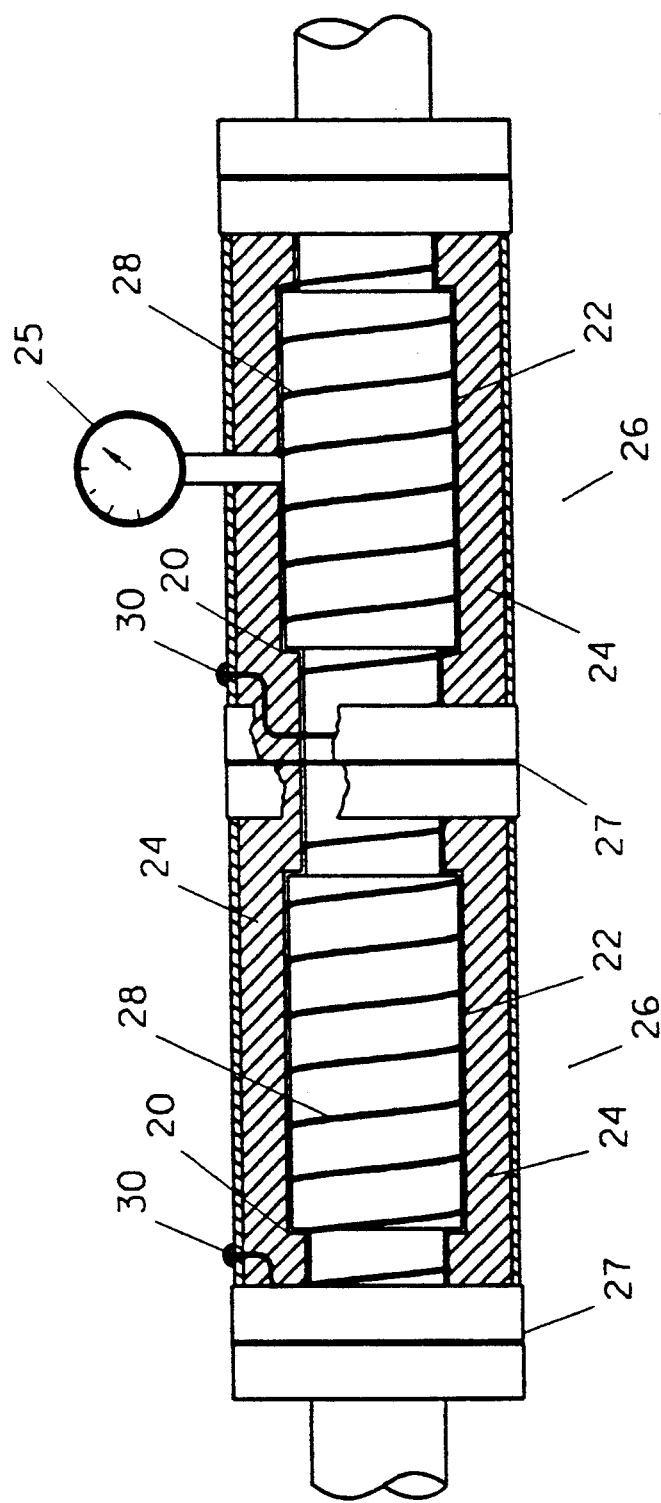
FIG. 1 depicts the configuration of the invention with the leak indicator mounted at the exterior perimeter of the insulation covering the fluid transmission system.

A joint 20 (FIG. 1) connects two lengths of fluid transmission piping 22. Insulating material 24 encloses joint 20, a portion of fixture 25 extending from the junction of fixture and fluid transmission piping 22, and fluid transmission piping 22 to form a transmission system 26. Leak proof barriers 27 (FIG. 2) are integrated into insulating material 24 to isolate fluid leaks along the fluid transmission system 26. A wick 28 (FIG. 1) wraps fluid transmission piping 22, the junction of fixture 25 and fluid transmission piping 22, and joint 20 to sense the presence of fluid leaking from fluid transmission system 26. This leaking fluid would be unobservable because of insulating material 24 enclosing fluid transmission system 26.

Leaking fluid contacts wick 28 and, through capillary action, progresses along wick 28, through insulating material 24, to a leak indicator 30. Wick 28 may have a sealed outer wall to isolate fluid transmission to only unwetted portions of the wick. The sealing material may be a material resistant to adhesion to other materials.

Figure 2:
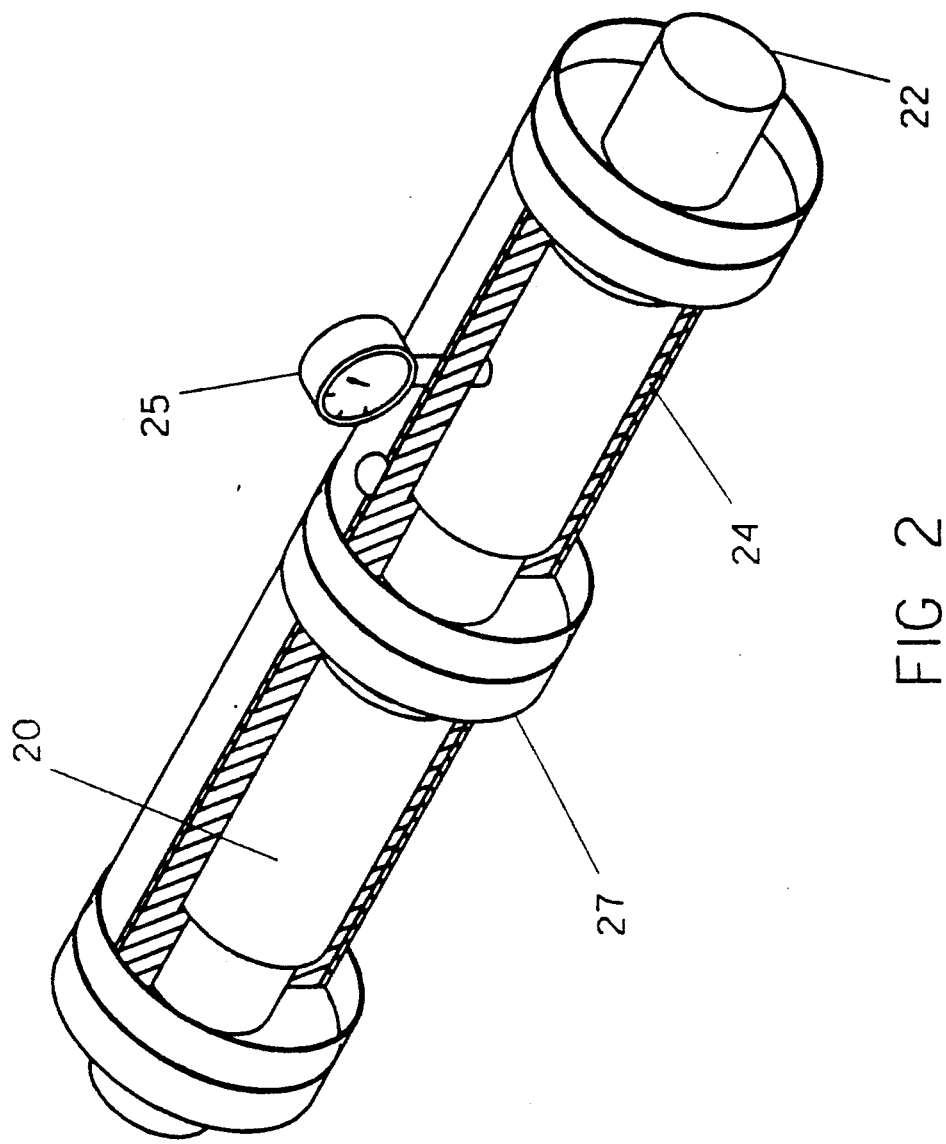
FIG. 2 shows leak proof barriers integrated into insulation to isolate leaks along the fluid transmission system.
Figure 3:
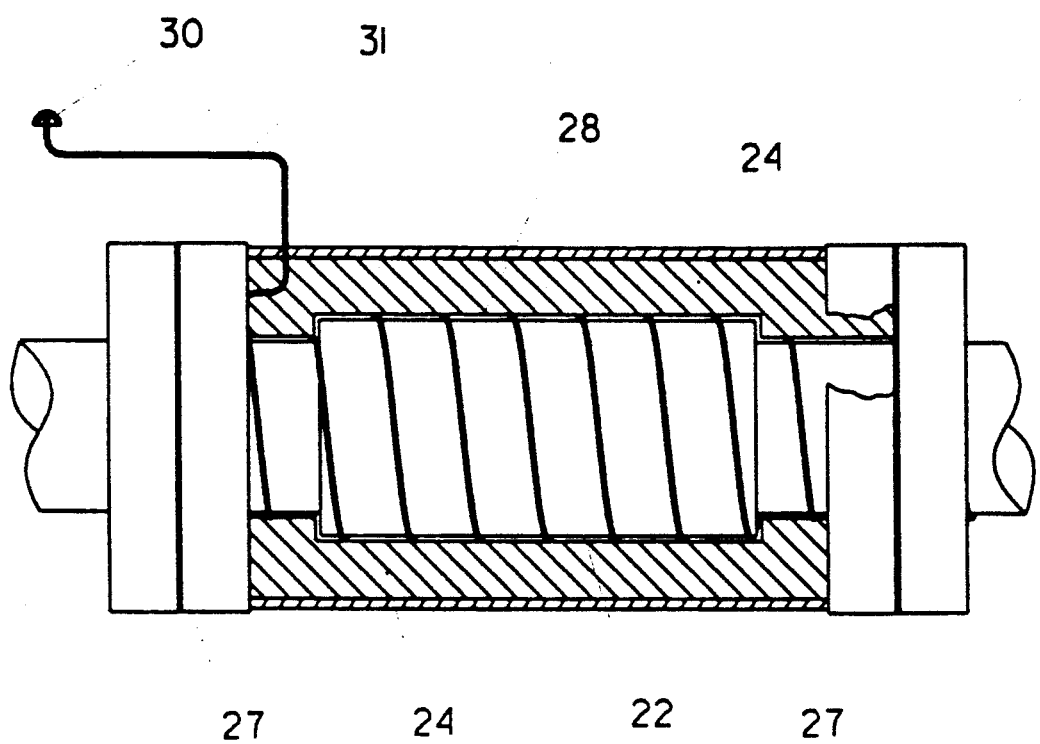
FIG. 3 shows a remotely located indicator having a sealed wick extending from the insulation, covering the fluid transmission system, to the leak indicator.
Figure 4:
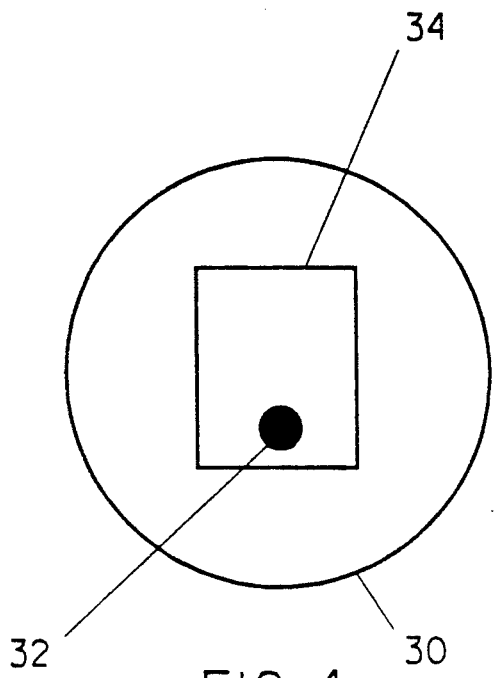
FIG. 4 shows an unwetted woven ribbon forming a leak indicator.
Figure 5:
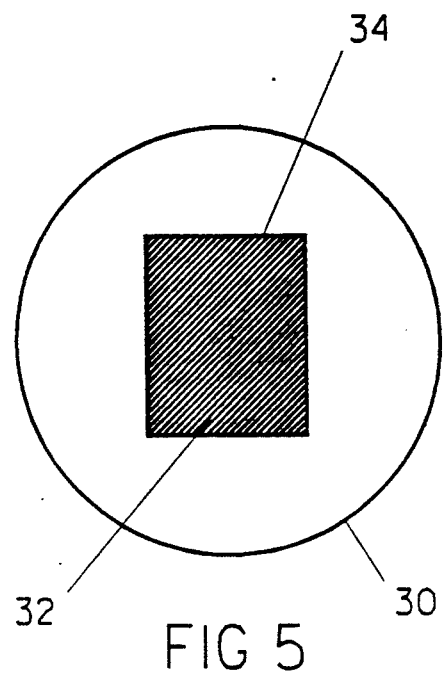
FIG. 5 shows a wetted woven ribbon indicating a leak in the fluid transmission system.

Leak indicator 30 may be located at the exterior perimeter of insulating material 24 (FIG. 1). Alternatively, leak indicator 30 may be remotely located by extending wick 28 through a capillary tube 31 (FIG. 3) to a remote viewing site. The wick transmitted fluid moves by capillary action through wick 28 to contact a spot of dye 32 (FIG. 4) at the base of a dry woven ribbon 34 which fills leak indicator 30. Fluid from wick 28, contacting dye 32, causes the dye to spread on woven ribbon 34 (FIG. 5) to indicate the presence of leaking fluid at the portion of the wick 28 wrapping joint 20, the junction of fixture 25 and fluid transmission piping 22, and/or fluid transmission piping 22. Woven ribbon 34 may appear as a white segment when dehydrated and brightly colored for visual detection when wetted by the wick transmitted fluid.

Figure 6:
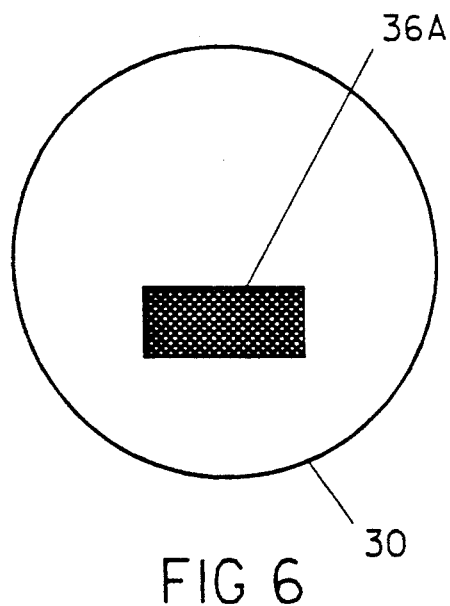
FIG. 6 shows an unwetted sponge material forming a leak indicator.
Figure 7:
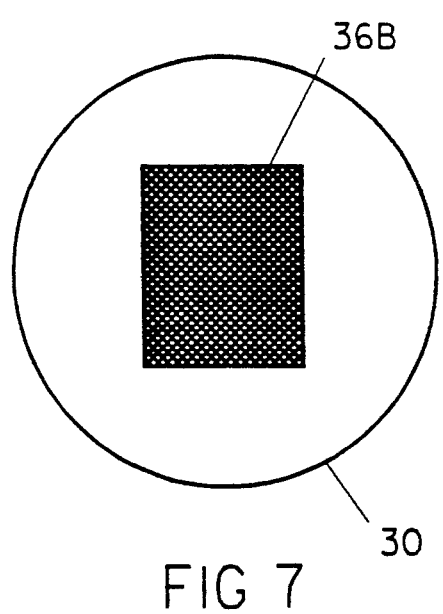
FIG. 7 shows a wetted sponge material indicating a leak in the fluid transmission system.

A dry sponge material 36 (FIG. 6) may replace woven ribbon 34 (FIG. 4) in leak indicator 30 to signal the presence of a leak along fluid transmission system 26 (FIG. 1). Sponge material 36 (FIG. 6) contacts wick 28 (FIG. 1) and absorbs fluid being transmitted by capillary action through wick 28. Sponge material 36 (FIG. 6) appearing as a narrow segment when dehydrated, expands (FIG. 7) to fill more of the available volume in the leak indicator 30 when wetted. The expanded sponge material 36 (FIG. 7) indicates to an observer the presence of a leak at the portion of wick 28 (FIG. 1) contacting fluid transmission piping 22, the junction of fixture 25 and fluid transmission piping 22, and/or joint 20. Sponge material 36 (FIG. 6) may include a dye to more vividly indicate to an observer the presence of a leak.

I claim:

1. A system for detecting and locating a fluid leak in a fluid containing vessel enclosed within an insulating material, the system comprising:
   a wick, associated with a selected area of the fluid containing vessel, having a sensing portion and a transmission portion, the sensing portion contacting an exterior surface of the selected area of the fluid containing vessel, the transmission portion extending from the sensing portion through the insulation to transmit by capillary action leaked fluid from the selected area of the fluid containing vessel;
   leak proof barriers, incorporated into the insulating material, for isolating the selected area of the fluid containing vessel so a fluid leak in the selected area is contained between leak proof barriers; and
   indicator means connected to the transmission portion of the wick, the indicator means activated by the leaked fluid transmitted through the wick to indicate a fluid leak in the selected area of the fluid containing vessel at the sensing portion of the wick.

2. The system for detecting and locating a fluid leak in a fluid containing vessel of claim 1, wherein the sensing portion of the wick comprises fluid transmission capillary material.

3. The system for detecting and locating a fluid leak in a fluid containing vessel of claim 1, wherein the transmission portion of the wick comprises a fluid transmitting capillary material having a sealed outer wall to limit fluid transmission to only unwetted portions of the capillary material.

4. The system for detecting and locating a fluid leak in a fluid containing vessel of claim 3, wherein the sealed outer wall of the capillary material is made of a material resistant to adhesion to other materials.

5. The system for detecting and locating a fluid leak in a fluid containing vessel of claim 1, wherein the indicator means comprises a woven ribbon having a moisture reactive dye positioned between the transmission portion of the wick and the woven ribbon so the dye spreads throughout the woven ribbon when the dye is wetted.

6. The system for detecting and locating a fluid leak in a fluid containing vessel of claim 1, wherein the indicator means comprises a dehydrated sponge which expands when wetted by the transmission portion of the wick.

* * * * *